(12) United States Patent
Lamar

(10) Patent No.: US 6,325,174 B1
(45) Date of Patent: Dec. 4, 2001

(54) PORTABLE TREE STAND AND SEAT

(76) Inventor: Lance Lamar, 21 E. Barney St., Gouverneur, NY (US) 13642

( * ) Notice: Subject to any disclaimer, the term of this patent is extended or adjusted under 35 U.S.C. 154(b) by 0 days.

(21) Appl. No.: 09/800,858

(22) Filed: Mar. 7, 2001

(51) Int. Cl.[7] ................................................. A01M 31/00
(52) U.S. Cl. ........................ 182/187; 182/116; 248/230.8
(58) Field of Search .................................... 182/187, 188, 182/116, 20; 248/230.1, 230.8

(56) References Cited

U.S. PATENT DOCUMENTS

| | | | |
|---|---|---|---|
| Re. 36,276 | 8/1999 | Smith | 182/187 |
| 2,855,980 | 10/1958 | Konieczka | 155/78 |
| 2,982,337 | 5/1961 | Arena | 155/78 |
| 4,120,379 | 10/1978 | Carter | 182/187 |
| 4,236,602 | 12/1980 | Leggett | 182/187 |
| 4,244,445 | 1/1981 | Strode | 182/136 |
| 4,819,763 * | 4/1989 | Grofe | 182/187 |
| 5,105,910 | 4/1992 | Engstrom | 182/187 |
| 5,131,496 | 7/1992 | White | 182/187 |
| 5,282,520 | 2/1994 | Walker | 182/116 |
| 5,336,922 | 8/1994 | Beechler | 182/188 |
| 5,363,941 | 11/1994 | Richard | 182/187 |
| 5,454,445 | 10/1995 | Berryman | 182/116 |
| 5,507,362 | 4/1996 | Krueger | 182/3 |
| 5,848,666 | 12/1998 | Woodall | 182/187 |
| 5,853,066 * | 12/1998 | Gohn | 182/187 |

* cited by examiner

Primary Examiner—Alvin Chin-Shue
(74) Attorney, Agent, or Firm—Brown & Michaels, PC

(57) ABSTRACT

A novel tree stand comprising a frame adapted to lie vertically along the trunk of a tree, having a sleeve attached at the top end to receive a seat; a sleeve attached at the bottom end to receive a footrest; a pair of wings rotatably attached to the frame; and a load-holding ratcheting tie strap which, when attached to both wings and tightened around the back of the tree, holds the wings back against the tree, thus bracing the frame so it does not swivel in place or move down the tree. The wings rotate backwards to fit any tree, and preferably have, upon the side that touches the tree, bumps, teeth or grooves that dig into the tree's surface to further ensure non-slippage. The frame preferably has one or more mounting plates for added stability, as well as, at various places: holes, hooks, handles or other holding means on either side for cable supports for a footrest. The invented tree stand can include as accessories a seat and footrest that are removable from the sleeves at the top and bottom ends, respectively, of the frame. The invented tree stand is multifunctional in that the footrest can function as a ladder stand for ease of entry into, and egress from, the stand. In one embodiment usable as a tree seat where the user's feet rest on the ground, the frame and wings are small, and there is no sleeve for a footrest.

20 Claims, 5 Drawing Sheets

PORTABLE TREE STAND AND SEAT

BACKGROUND OF THE INVENTION

1. Field of the Invention

The invention pertains to the field of devices for observing or hunting wildlife. More particularly, the invention pertains to a lightweight, stable, portable tree stand and seat.

2. Description of Related Art

To observe or hunt wildlife, it is advantageous for an individual to be positioned so as to view the wildlife from a distance. It is also advantageous to be so positioned that the wildlife does not detect the presence of the observer or hunter. A device to accommodate both such needs is a tree stand providing an elevated position on a tree from which to observe or hunt. From such a height, wildlife over a large area can be seen, and ground animals that sense danger primarily along the ground are less likely to be frightened off.

A number of tree stands providing an elevated position are known in the art. For example, U.S. Pat. No. 2,855,980, PORTABLE SEAT FOR HUNTERS (Konieczka, 1958), discloses a tree stand having a vertical shaft, with a 'V' on the back to grip a tree. A chain is attaches the tree stand to the tree, and a drop-down seat is included. U.S. Pat. No. 2,982,337, TREE SEAT (Arena, 1961), shows a tree seat with a pipe bent into "d" shape. A vertical pipe section having arcuate plates at top and bottom grips the tree. The seat is held to the tree by chains around the tree at the plates. The seat is fixed on the pipe. U.S. Pat. No. 4,120,379, TREE STAND AND SEAT (Carter, 1978), discloses a tree stand with a vertical frame and a seat. The frame has two vertical pipe segments. The seat is fastened to the tree by ropes. The stand and seat collapse for carrying. U.S. Pat. No. 4,236,602, TREE STAND AND SEAT (Leggett, 1980), discloses a tree stand having a vertical pipe, a drop-down seat at the top of the stand, and a foot plate at the bottom. The stand is fastened to the tree by a strap at the top. There are no stabilizing elements. U.S. Pat. No. 5,848,666, ADJUSTABLE TREE STAND (Woodall, 1998), shows a tree stand with a vertical shaft held to the tree by two straps. Solid 'W' or 'V' shaped pieces of flat stock, to which the straps attach, grip the tree. U.S. Pat. No. Re. 36,276, TREE STAND (Smith, 1999), discloses a tree stand having a vertical shaft, a non-hinged 'V' grip at the bottom, and a rope at the top to strap the stand to the tree.

Although the above devices provide elevation for advantageous hunting and/or observation of wildlife, they generally constitute permanent fixtures to a tree (or other vertical support). Additionally, they can be cumbersome to adjust, carry, or relocate, and modularity is generally missing, so that the user is "stuck" with whatever footrest or seat comes as part of the stand. Finally, the extra weight of the seat and footrest cause the stand to pull away from the tree during installation, thus rendering more difficult the act of securing the stand at an elevated position on the tree with one hand while holding onto the tree with the other. Accordingly, there is a need for a lightweight tree stand which provides a safe platform for the user, having stabilizing supports and modular installation of seat and footrest for ease of installation and of switching the seat or footrest.

SUMMARY OF THE INVENTION

The present invention is directed to a tree stand that solves the above problems, providing an elevated and safe platform for the hunter or wildlife observer (hereinafter, the "user"), having stabilizing elements and modularly attachable seat and footrest for ease of switching the same. Briefly stated, the invented apparatus comprises a vertical frame having a top end and a bottom end; a sleeve attached at the top end to receive a seat; a sleeve attached at the bottom end to receive a footrest; a pair of wings rotatably attached to the frame, each having, at one or more places, holes or hooks or other means for attachment of a strap; and one or more load-holding ratcheting tie straps attached to both wings, which, when tightened around the back of the tree, hold the wings back against the tree for stabilization, thus bracing the frame against the tree so that it does not swivel in place or slide down the tree. When the device is not in use, the wings rotate together to provide a convenient carrying handle. The device is preferably light weight, and hence is preferably made from aluminum. The device can also be made from steel or any other substance having sufficient strength to hold the user.

The invented device also preferably includes a seat and footrest which are removable from the sleeves at the top and bottom, respectively, of the frame. Such removability, or modularity, facilitates easy replacing or switching of the seat and/or footrest without having to obtain another frame or remove an installed frame from the tree upon which it is installed. Such modularity also facilitates installation of the device at an elevated height upon the tree. The reason is that, prior to installation the footrest and seat can be removed, and their absence during installation renders the invented device less likely to pull away from the tree during installation. As a result, the installer more easily positions the device and tightens the ratcheting tie strap(s) around the back of the tree.

The wings rotate backward to fit any tree and, once in place, do not move, either side to side or downward upon the tree. In addition, with no seat or footrest permanently attached, the device is multi-functional (see below). The frame may be left in place upon the tree after removing the seat and footrest, so it is set to return to for subsequent use.

DETAILED DESCRIPTION OF THE INVENTION

Figure 1:
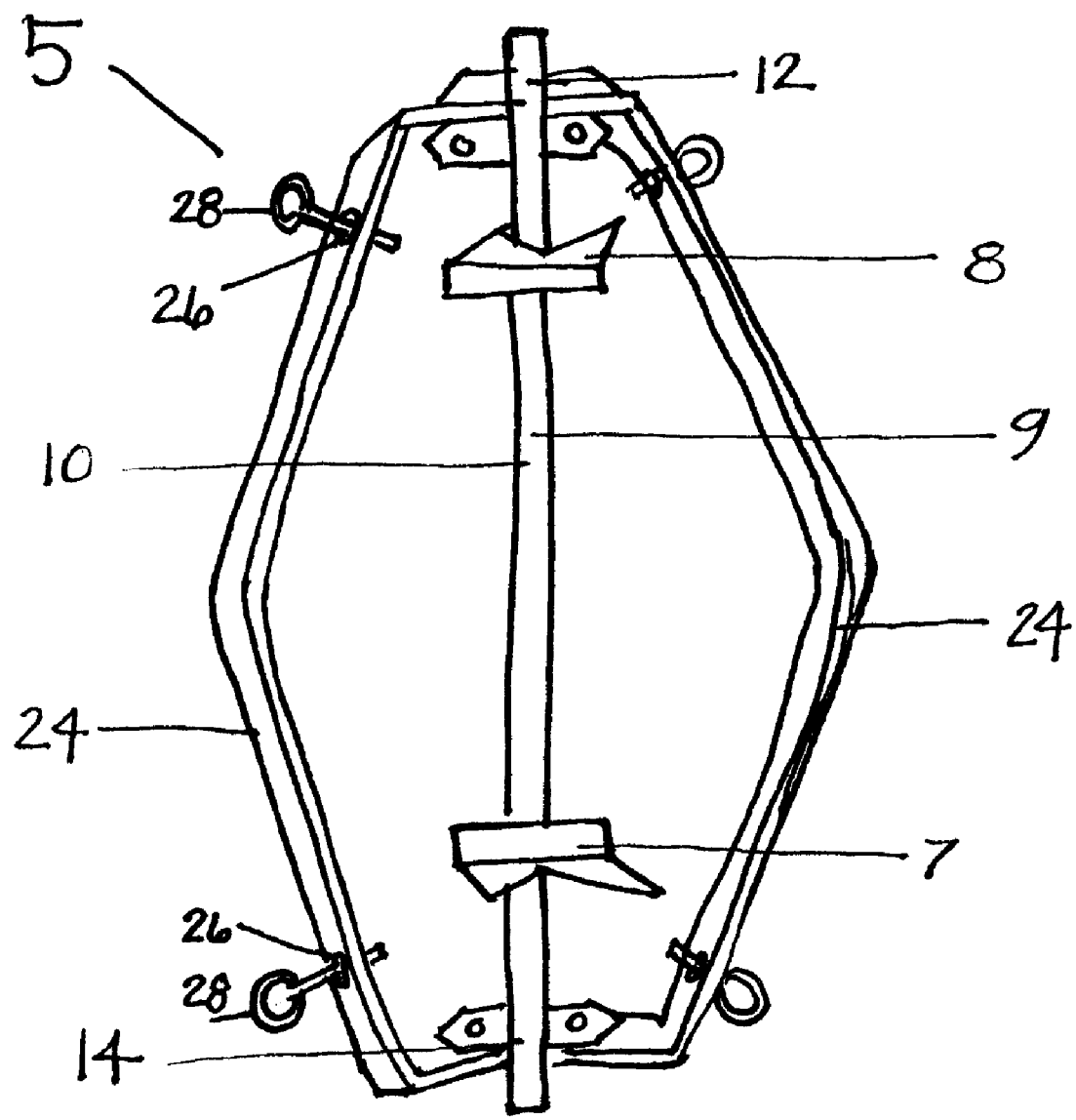
FIG. 1 is a back view of the invented tree stand.

To assist in a better understanding of the present invention, a specific embodiment of the invention will now be described in detail. Although such is the preferred embodiment, it is to be understood that the invention can take other embodiments. This detailed description of the invention will include reference to FIGS. 1 through 5. The same reference numerals will be used to indicate the same parts and locations in all the figures unless otherwise indicated. It will be apparent to one skilled in the art that the present invention may be practiced without some of the specific details described herein.

1. Tree Stand Embodiment

Referring now to the drawings, there is shown a lightweight, portable tree stand according to the present invention, generally designated (5). When installed upon a tree or other similar vertical support, the tree stand provides to the user a safe and stable perch from which to observe or hunt wildlife.

Figure 2:
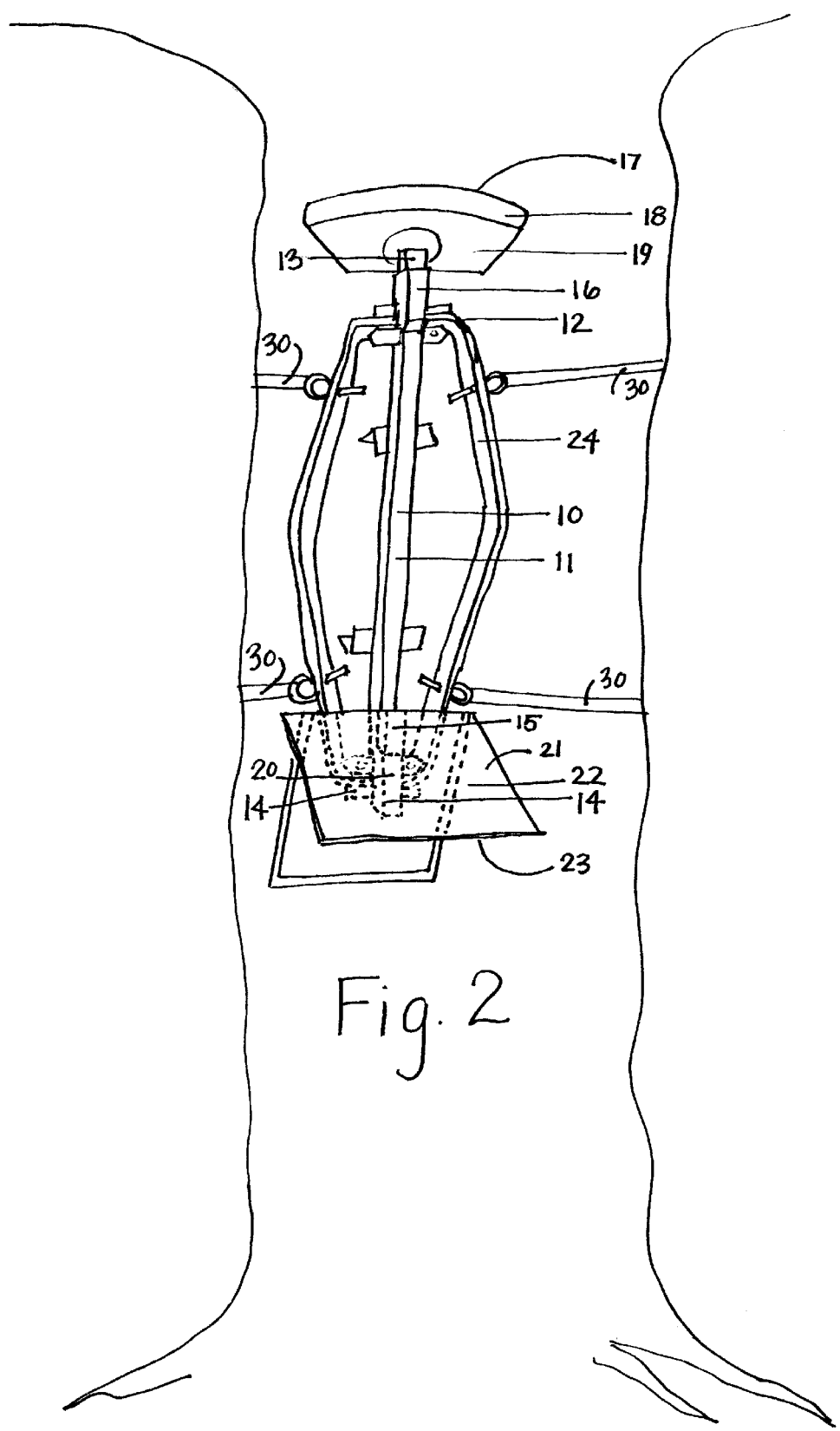
FIG. 2 shows the invented tree stand mounted upon a tree, with seat and footrest installed.
Figure 3:
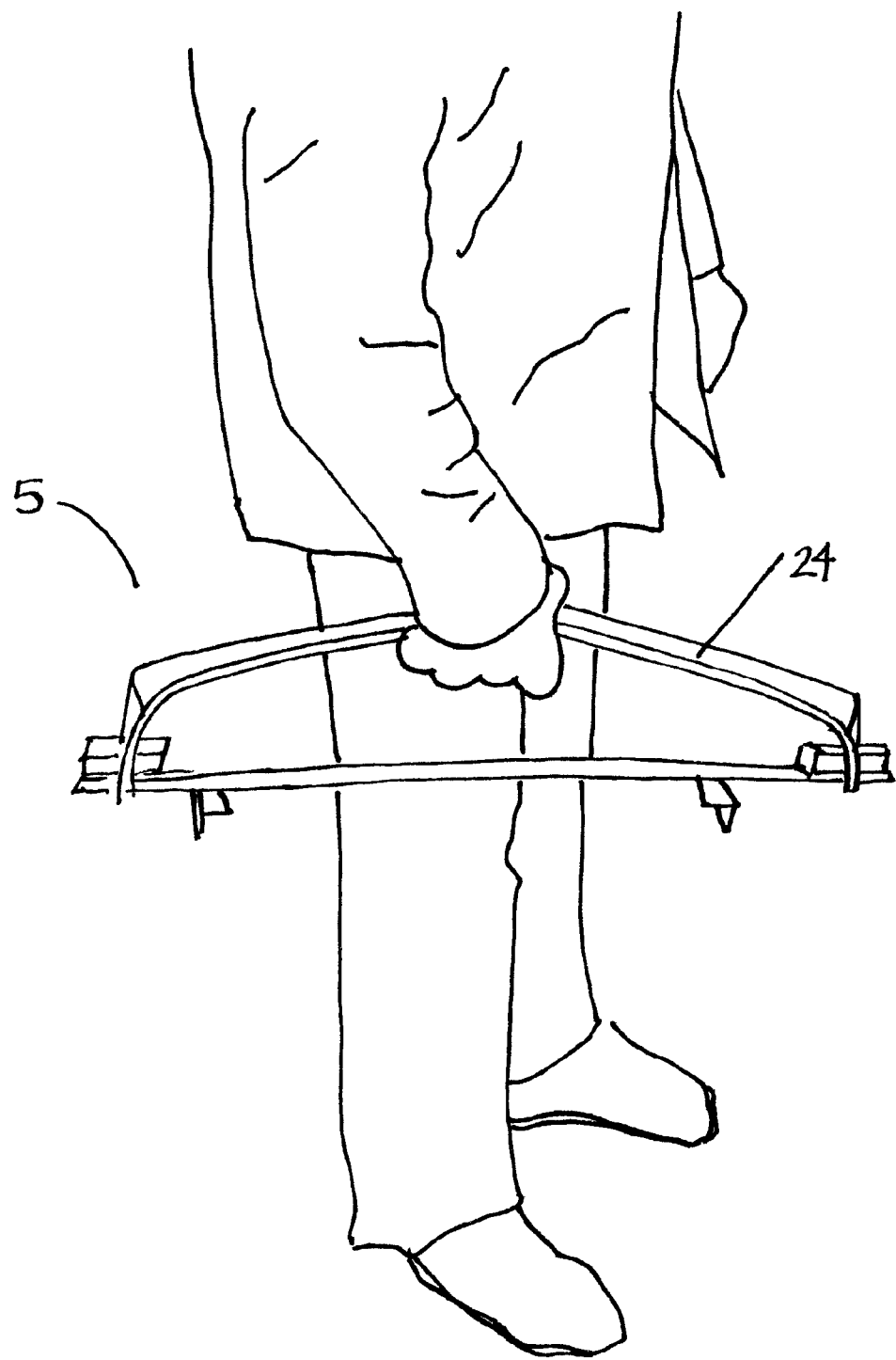
FIG. 3 shows the invented tree stand folded up for carrying.

Referring to FIGS. 1–3, according to the preferred embodiment the invented tree stand (5) includes: a frame (10), having a back surface (9), a front surface (11), a top end (12) and a bottom end (14), generally adapted to lie vertically in a substantially parallel relationship with a tree trunk, with the back surface (9) flush against the trunk; preferably, a bottom mount plate (7) and top mount plate (8) are attached to the back surface (9), disposed perpendicularly thereto, for stabilization of the frame during installation and use; a sleeve (16) attached to the front surface (11) at the top end (12) to receive a seat (18) therein; a sleeve (20) attached to the front surface (11) at the bottom end (14) to receive a footrest (22) therein; a pair of wings (24) rotatably attached to the frame (10), each having, at one or more places (26), a securing means (28) such as a hole, hook, or handle, for securing a holding means such as a load-holding ratcheting tie strap (30), which, when secured to both wings (24) and tightened around the back of the tree trunk, holds the wings (24) back against the tree for stabilization, thus bracing the frame (10) so that it does not swivel in place or slide down the tree trunk. The wings (24) rotate backward to fit any tree and, once in place, do not move, either side to side or downward upon the tree. The wings (24) preferably have, upon the side that touches the tree, bumps, teeth or grooves that dig into the tree's surface to further ensure non-slippage. The wings (24) provide support for the tree stand and maintain stability by preventing the frame from swiveling and allowing movement upon the stand without movement of the stand against the tree. The frame (10) preferably has, at various places: holes, hooks, handles or other attaching means (11) on either side for cable supports for a footrest (22) (see FIG. 2).

Referring to FIG. 2, the invented device (5) also preferably includes, as removable accessories, a seat (18) having a top surface (17) and a bottom surface (19), and a footrest (22), having a top surface (21) and a bottom surface (23), which are removable from the sleeves (16, 20) at the top end (12) and bottom end (14), respectively, of the frame (10). The bottom surface (19) of the seat (18) has attached thereto a vertical member (13) slidably insertable into the sleeve (16) disposed at the top end (12) of the frame (10). When the vertical member (13) is inserted into the sleeve (16), it supports the seat (18). Preferably, the bottom surface (19) of the seat (18) extends sufficiently backwards that a portion of the bottom surface (19) rests upon the top end (12) of the frame (10) for additional support. Likewise, the bottom surface (23) of the footrest (22) has attached thereto a vertical member (15) slidably insertable into the sleeve (20) disposed at the bottom end (14) of the frame (10). When the vertical member (15) is inserted into the sleeve (20), it supports the footrest (22).

It is noted that the removability, or modularity, of the seat (18) and footrest (22) has several advantages. It allows for easy replacing of the seat (18) and/or footrest (22). This is particularly advantageous if the user requires different types of seats for different types of hunting, e.g., gun hunting versus bow hunting. Also, if a seat wears out, it can be replaced without obtaining a new tree stand. A seat can wear out if, for example, it has embedded cushions which wear down. Additionally, different users may prefer different seat styles, depending upon a user's weight, size, or general preferences. Further, as accessory technology improves, a user may wish to install a seat with improved features—such as armrests, swiveling, or battery-based heating—without obtaining a new tree stand. Such accessory substitution can occur while the invented stand is installed upon a tree.

Another advantage to the removability of seat (18) and footrest (22) is that such allows for accessory-free installation of the stand upon a tree. This is advantageous because the stand (5) is lighter weight during installation, and because the absence of the accessories (18, 22) diminishes the tendency of the stand (5) to pull away from the tree prior to tightening of the ratcheting tie strap(s) (30). The tendency of prior art tree stands to pull away from the tree is a source of danger during installation, as the installer uses one hand to hold the device to the tree, while the other hand is alternately used to hold the tree so as not to fall, and to tighten the chain, cable or other holding means, around the tree. Because the invented device's (5) frame (10) alone can be tightened to the tree during installation, the installer more easily positions the device (5) and tightens the ratcheting tie strap(s) (30) around the back of the tree while holding onto the tree. At the end of a day's hunting or observation, the invented device (5) may be left in place upon the tree so that it is ready for subsequent use. Even if the seat and footrest are removed at the end of the day or hunting season, the frame (10) and wings (24) may be left upon the tree indefinitely for subsequent use.

Referring to FIG. 3, when the device (5) is not installed, the wings (24) rotate together to provide a convenient carrying handle. The device (5) is preferably light weight, and hence is preferably made from aluminum. The device is alternatively made from steel or any other substance capable of holding the user.

Figure 4:
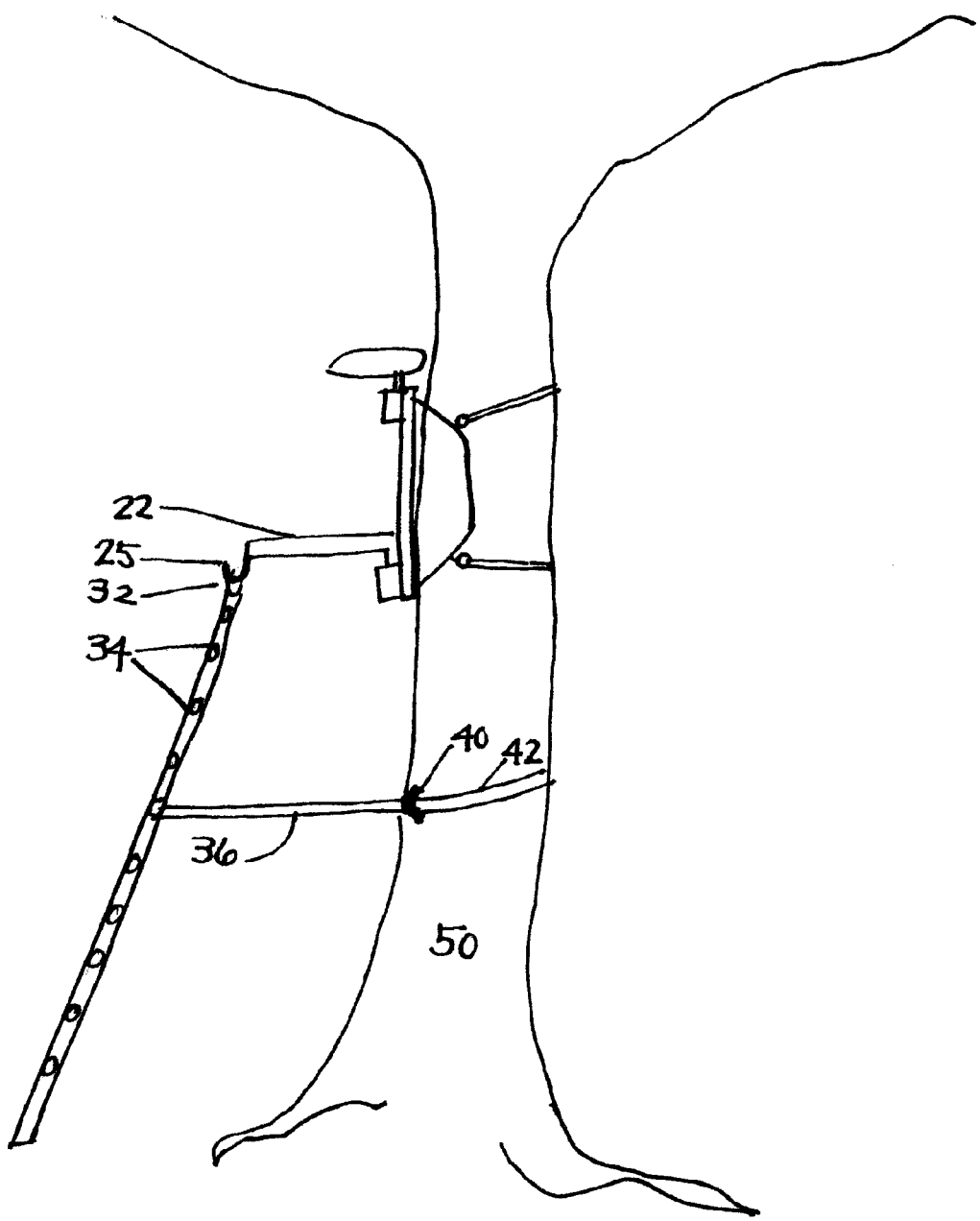
FIG. 4 shows an embodiment of the invented tree stand in which the footrest is the top of a ladder.

The invented device is multifunctional, as it can also be used as a ladder stand. Referring to FIG. 4, in one embodiment of the invention the footrest (22) constitutes the top of a ladder (32). The footrest (22) has a hook (25) or other attaching means to secure the ladder (32). The ladder (32) has ladder means (34) such as sticks or rungs, as well as a support rod (36) disposed substantially horizontally between the ladder means (34) and the tree (50). The support rod (36) connects the ladder's ladder means (34) to the tree (50) to provide stability. The end of the support rod (36) that touches the tree (50) preferably has a brace (40) attachable to the tree either by means of a tie strap (42) or fastening means such as nails, screws or bolts (not shown), or both. In this way, the user can, with assurance of stability, climb the ladder means to assume his or her perch in the tree stand, and subsequently descend the ladder means to the ground, again with assurance of stability.

2. Tree Seat Embodiment

One embodiment of the invented device is suitable for use as a tree seat in which the user's feet rest on the ground. In this tree-seat embodiment, the frame and wings are smaller than those of the tree-stand embodiment. There is no footrest, and hence no sleeve for insertion of the same at the bottom of the frame. Generally, one strap is sufficient to hold the wings against the tree, although more than one could be used. The frame is attached to the tree at a low altitude to facilitate placement of the user's upon the ground when sitting in the seat.

Figure 5:
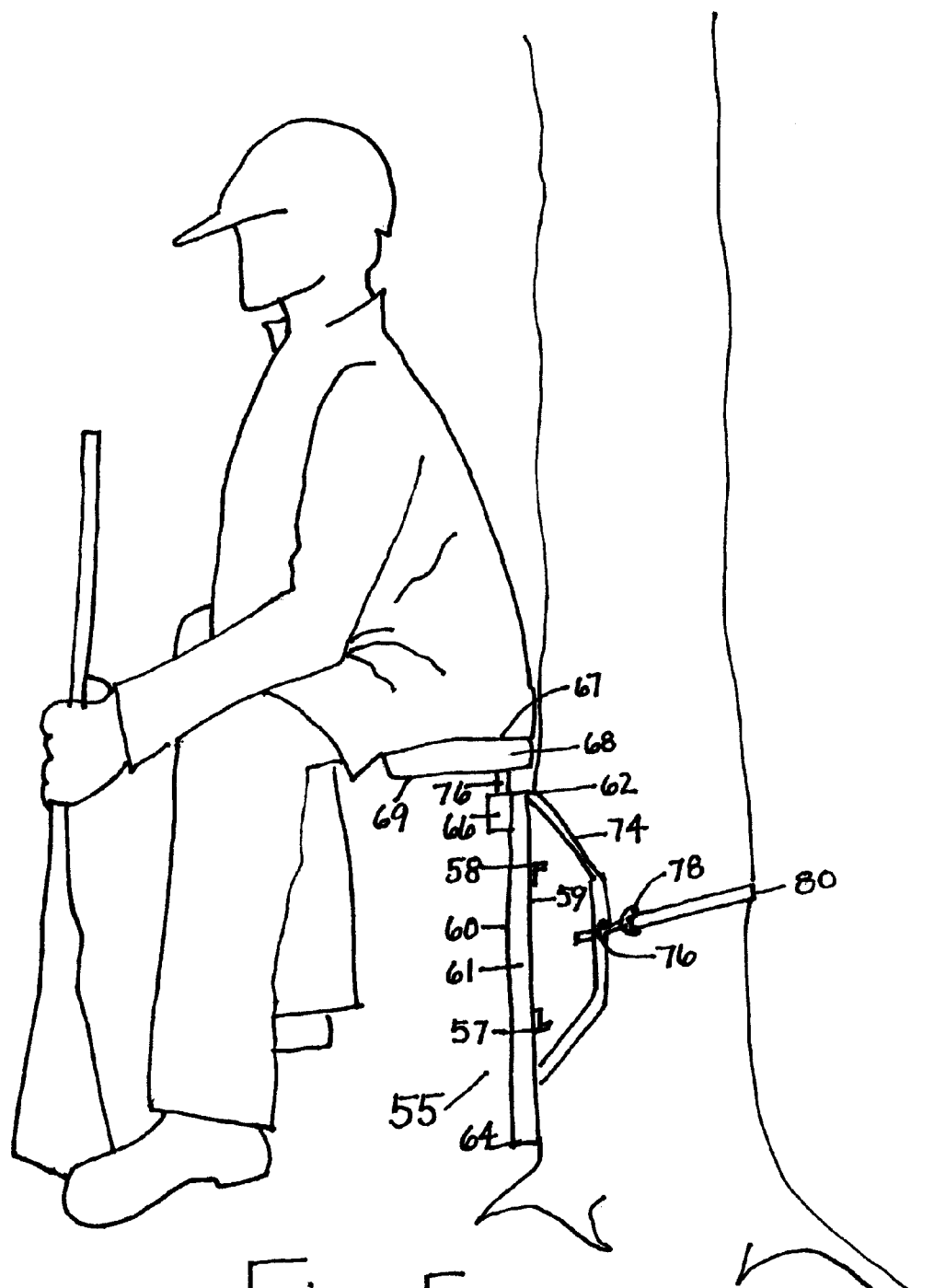
FIG. 5 shows the tree seat embodiment of the invented device.

Referring to FIG. 5, a tree seat embodiment (55) includes: a frame (60), having a back surface (59), a front surface (61), a top end (62) and a bottom end (64), generally adapted to lie vertically in a substantially parallel relationship with a tree trunk, with the back surface (59) flush against the trunk near the ground; preferably, a bottom mount plate (57) and top mount plate (58) are attached to the back surface (59), disposed perpendicularly thereto, for stabilization of the frame during installation and use; a sleeve (66) attached to the front surface (61) at the top end (62) to receive a seat (68) therein; a pair of wings (74) rotatably attached to the frame (60), each having at a point (76) farthest from the frame (60), a securing means (78) such as a hole, hook, or handle, for securing a holding means such as a load-holding ratcheting tie strap (80), which, when secured to both wings (74) and tightened around the back of the tree trunk, holds the wings (74) back against the tree for stabilization, thus bracing the frame (60) so that it does not swivel in place or slide down the tree trunk. The wings (74) rotate backward to fit any tree and, once in place, do not move, either side to side or downward upon the tree. The wings (74) preferably have, upon the side that touches the tree, bumps, teeth or grooves that dig into the tree's surface to further ensure non-slippage. The wings (74) provide support for the tree seat and maintain stability by preventing the frame from swiveling.

The invented tree seat (55) also preferably includes, as a removable accessory, a seat (68) having a top surface (67) and a bottom surface (69), which is removable from the sleeve (66) at the top end (62) of the frame (60). The bottom surface (69) of the seat (68) has attached thereto a vertical member (63) slidably insertable into the sleeve (66) disposed at the top end (62) of the frame (60). When the vertical member (63) is inserted into the sleeve (66), it supports the seat (68). Preferably, the bottom surface (69) of the seat (68) extends sufficiently backwards that a portion of the bottom surface (69) rests upon the top end (62) of the frame (60) for additional support.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A stand adapted for attachment to a tree comprising:
  a) a frame having a back surface, a front surface, a top end, a bottom end, and a middle section, wherein the middle section comprises a portion of the frame between the top and bottom ends, and wherein the frame has attached to the front surface at the top end a top sleeve adapted to hold a seat, and wherein the frame has attached to the front surface at the bottom end a bottom sleeve adapted to hold a footrest;
  b) a first wing having a back surface and a second wing having a back surface, both rotatably attached to the middle section, for rotating backwards against the tree, wherein each wing has at least one securing means for securing a tightenable holding means which wraps taught around a back of the tree; and
  c) a tightenable holding means having a first end and a second end, wherein the first end is secured to the first wing at the at least one securing means of the first wing, the second end is secured to the second wing at the at least one securing means of the second wing, and the holding means is tightenable around the back of the tree to pull the first and second wings backwards in a hugging fashion about the tree such that the back surface of the first wing and the back surface of the second wing press against the tree.

2. The stand of claim 1 further comprising at least one mount plate attached to the frame's back surface, for stabilization during installation and use.

3. The stand of claim 1 wherein the tightenable holding means is one or more ratcheted tie straps.

4. The stand of claim 1 wherein each of the at least one securing means is selected from the group consisting of a hook, a hole, and a handle.

5. The stand of claim 1 wherein the back surface of each wing has extra-friction means.

6. The stand of claim 5 wherein the extra friction means is selected from the group consisting of bumps, points, grooves, waves, and protrusions.

7. The stand of claim 1 wherein one of each wing's at least one securing means is disposed at a point of the wing farthest from the frame.

8. The stand of claim 1 further comprising:
  a) a seat, for supporting a support a person, having a bottom seat surface with an attached vertical seat member insertable into the top sleeve; and
  b) a footrest, for supporting the feet of a person, having a bottom footrest surface with an attached vertical footrest member insertable into the bottom sleeve.

9. The stand of claim 8 wherein, when the vertical seat member is inserted into the top sleeve, a back portion of the seat rests upon the top end for added support.

10. The stand of claim 8 wherein the footrest further comprises an attaching means to secure a ladder.

11. The stand of claim 10 further comprising a ladder, wherein the ladder comprises
  a ladder means having a securing means disposed at a top of the ladder means, wherein the securing means is attachable to the attaching means of the footrest, and
  a support rod disposed substantially horizontally to extend between the ladder means and the tree such to connect the ladder means to the tree, wherein an end of the support rod has a brace attachable to the tree.

12. A stand adapted for attachment to a tree comprising:
  a) a frame having a back surface, a front surface, a top end, a bottom end, and a middle section, wherein the middle section comprises a portion of the frame between the top and bottom ends, and wherein the frame has attached to the front surface at the top end a sleeve adapted to hold a seat;
  b) a first wing having a back surface and a second wing having a back surface, both rotatably attached to the middle section, for rotating backwards against the tree, wherein each wing has a securing means for securing a tightenable holding means which wraps taught around a back of the tree; and
  c) a tightenable holding means having a first end and a second end, wherein the first end is secured to the first wing at the securing means of the first wing, the second end is secured to the second wing at the securing means of the second wing, and the holding means is tightenable around the back of the tree to pull the first and second wings backwards in a hugging fashion about the tree such that the back surface of the first wing and the back surface of the second wing press against the tree.

13. The stand of claim 12 further comprising at least one mount plate attached to the frame's back surface, for stabilization during installation and use.

14. The stand of claim 12 wherein the tightenable holding means is one or more ratcheted tie straps.

15. The stand of claim 12 wherein the securing means is selected from the group consisting of a hook, a hole, and a handle.

16. The stand of claim 12 wherein the back surface of each wing has extra-friction means.

17. The stand of claim 16 wherein the extra friction means is selected from the group consisting of bumps, points, grooves, waves, and protrusions.

18. The stand of claim 12 wherein each wing's securing means is disposed at a point of the wing farthest from the frame.

19. The stand of claim 1 further comprising a seat, for supporting a support a person, having a bottom seat surface with an attached vertical seat member insertable into the sleeve.

20. The stand of claim 19 wherein, when the vertical seat member is inserted into the sleeve, a back portion of the seat rests upon the top end for added support.

* * * * *